Nov. 25, 1930.  C. CAMUSET  1,782,603
DIFFUSION PLANT
Filed Aug. 30, 1926  2 Sheets-Sheet 2
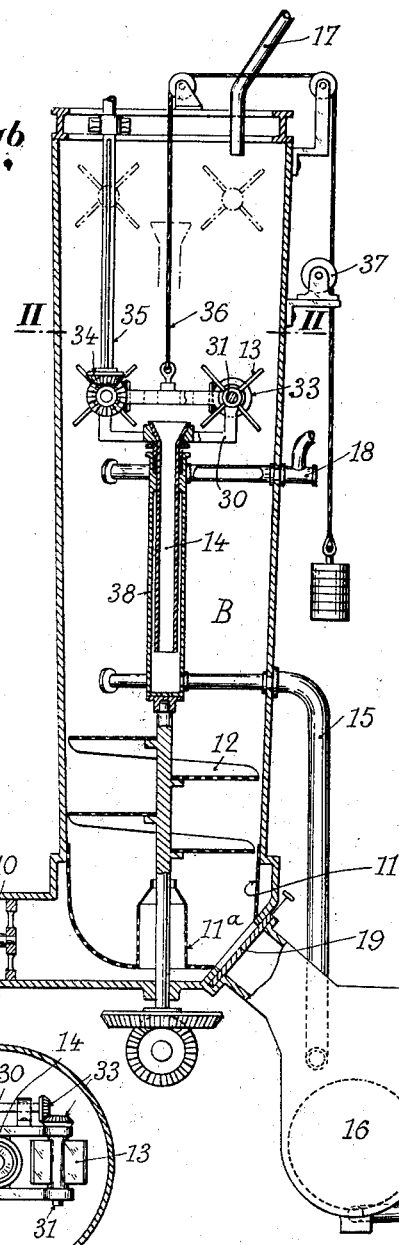
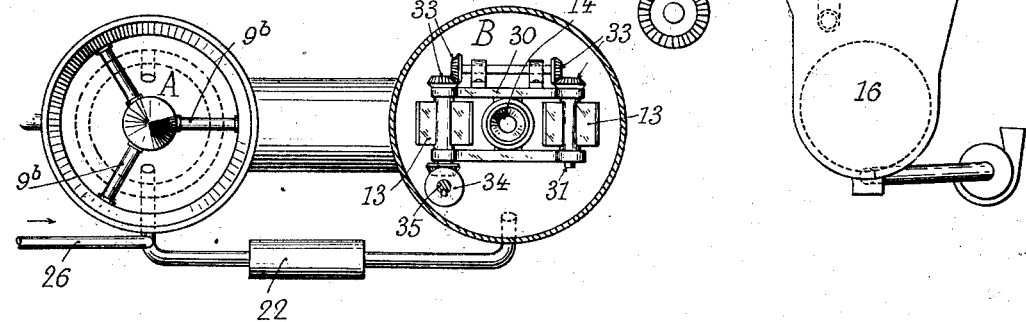
C. Camuset
INVENTOR
By: Marko & Clark
Attys.

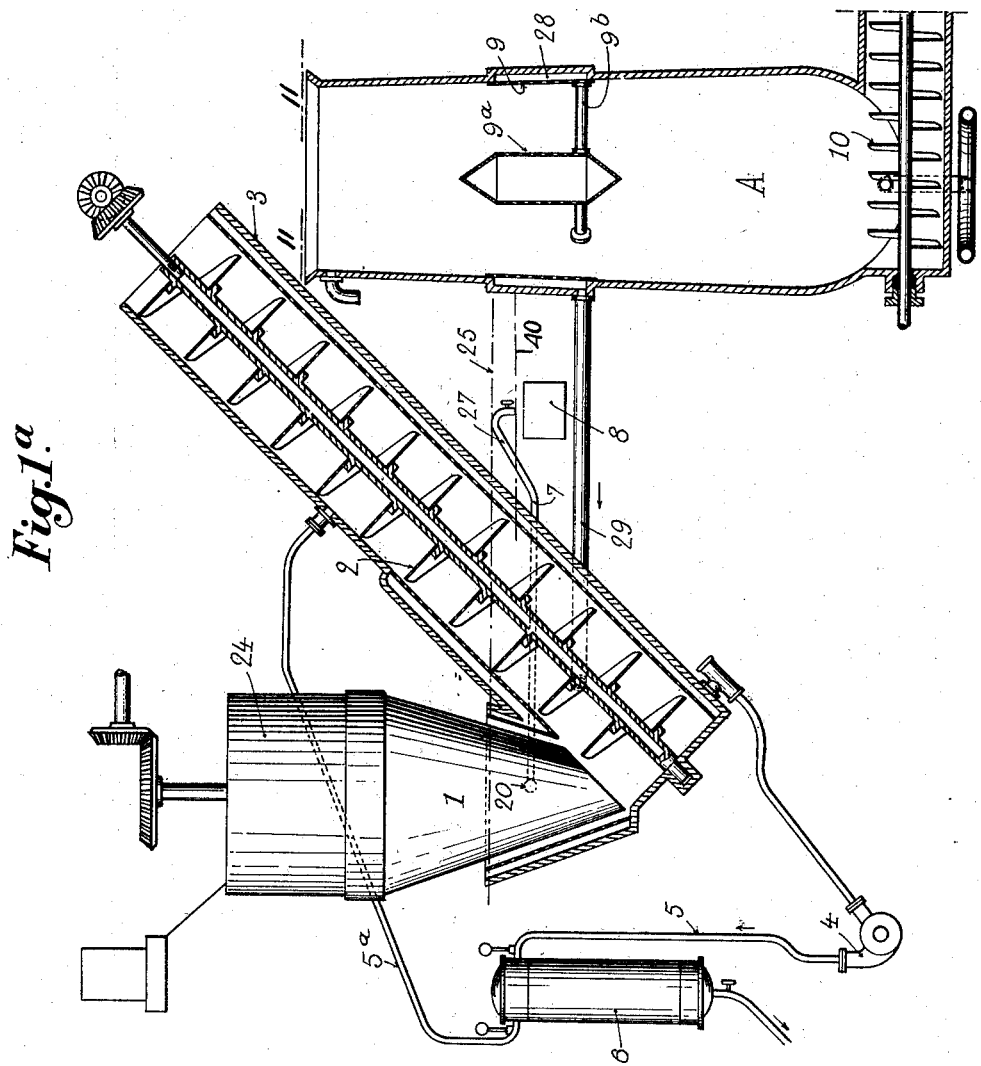

Patented Nov. 25, 1930

1,782,603

UNITED STATES PATENT OFFICE

CHARLES CAMUSET, OF BRETIGNY-SUR-ORGE, FRANCE

DIFFUSION PLANT

Application filed August 30, 1926, Serial No. 132,572, and in France September 25, 1925.

In the diffusion process, in order to extract the sugar from beets, sugar cane and other substances adapted for diffusion, the following conditions must be complied with:

1. Diffusers of a suitable shape must be employed.

2. The material must be cut into pieces of such form as to provide for the proper circulation.

3. The diffusers must be completely filled, and in the proper manner, based upon a well-determined minimum weight relatively to the net capacity of the apparatus.

4. The apparatus must be properly heated, that is to say, the requisite maximum temperature must be produced as near as possible to the forward end of the battery; the apparatus is to be heated as near the rear end of the battery as possible. The standard temperature for each diffuser is to be constantly maintained, and chiefly upon the diffusers operating at the highest temperature; the desired volume of juice is to be properly withdrawn from each diffuser.

These conditions, and chiefly the two latter conditions, can only be realized with difficulty, since they require continued attention from the operators, who fail to understand the importance of the question. The heating of the diffusers, which is the most important point for the operation of the battery, is very difficult to regulate in the proper manner.

In fact, each time the material under treatment proceeds from a diffuser to the following one, the temperature is modified in all the diffusers concerned in the circulation, and the degree of opening of the steam supply valves is to be again regulated. But this action does not produce an instantaneous effect; this effect is obtained only by repeated trials, and there are often found considerable differences of temperature above or generally below the normal, and in this manner the material is insufficiently exhausted, and the result will be a loss of sugar during the whole time necessary to restore the normal temperature of the battery.

The present invention relates to an apparatus, the operation of which is carried out according to a continuous cycle, and which comprises mechanical means whereby the inverse circulation of the solid material (beets or sugar cane) and of the juice will be assured in a regular manner in any portion of the apparatus. Due to this regular action, the operating temperature in the different sections of the battery will be maintained at a constant value, thus offering an increased output of sugar, and the stopping and the difficulties of regulation which occur in intermittent diffusion, after each load of fresh solid material, are thus obviated.

This method of diffusion further offers the following advantages:

A saving of labor due to the elimination of such operations as emptying and filling the diffusers, withdrawal of the juice and the like;

A saving of water, due to the elimination of the diffusion water and to the circulation of the press water into the diffusion circuit;

The elimination of the great trouble caused by the necessity of evacuating the residual diffusion water, since this water is no longer produced;

An increase in the proportion of pulp, since the diffusion water and especially the press water are the cause of a great loss of the dry material;

Due to the elimination of the loss of the press water, the proportion of dry substance in the pulp may be increased and the drying of the pulp may be made in an economical manner, thus offering a product which is most advantageous in all respects.

The operation of the plant is clearly set forth in the following description, with reference to the appended drawings which show by way of example a practical embodiment of the invention.

In this drawing:

Figs. 1ª and 1ᵇ are longitudinal sections of the apparatus.

Fig. 2 is a top view of the diffusers on the line II—II of Figures 1ª and 1ᵇ.

The apparatus shown in the drawings consists essentially of an apparatus for heating the solid material (cut beets or the like) and of two diffusers of the continuous type.

The heating apparatus for the solids consists of a tight hopper 1; a perforated helical elevator 2, which is upwardly inclined, rotates in a receptacle 3 having a double perforated bottom. A centrifugal pump 4 sets up a circulation, through the pipes 5 and 5ª, between the receptacle 3, the heater 6, and a suitable point near the middle of the said receptacle. A discharging pipe 7 serves to bring the juice from the hopper 1 to a tipping device 8 and serves also to determine with its bent part 27 the maximum level 25 of the liquid in the hopper 1, the receptacle 3 and the first diffuser A as will be hereafter explained.

The first diffuser A consists of a tapered vessel with vertical axis, the walls having a suitable inclination in order to facilitate the dropping of the solids; near the upper part, the walls are perforated at 9 for the passage of the juice in an annular space 28; a like perforated part 9ª supported by the tubes 9ᵇ may be provided at the centre of the diffuser. The juice passing through 9ª is brought by the tubes 9ᵇ in the annular space 28. From said space 28 a tube 29 brings the juice in the receptacle 3. When the level of the liquid rises in the hopper 1, the receptacle 3 and the diffuser A, the level of the liquid rises also in the part 27 of the pipe 7. As soon as the level of the liquid attains the line 25, the bent part 27 operates as a siphon and the liquid flows out into the device 8 until the level of the liquid attains the level 40 of the outlet orifice of the bent part 27. The level of the liquid rises then again in the apparatus and the same cycle is repeated, so that the level is constantly maintained between the lines 25 and 40.

At the lower part of the diffuser A is disposed a conveyor 10 which consists of a perforated screw, or like mechanical device, which is rotated at different speeds according to requirements, in order to force the solids into the second diffuser B.

The second diffuser consists of a tapered vessel with vertical axis, with the large end uppermost, the walls having the proper inclination; at the bottom is provided the perforated surface 11 and optionally a like surface 11ª for the discharge of the juice. A perforated conveyor or screw 12 is mounted at the lower part of the said vessel to aid in the circulation of the material.

At the upper part of the diffuser B is provided a stirring device which is vertically movable and which maintains the solids in suspension in the water, and impels the same towards the central telescoping tube 14. Said stirring device may be of any known type and its constructional features form no part of the present invention. For example on a frame 30 secured on the tube 14 may be rotatably mounted axles 31 carrying paddles 13. Said axles are operatively connected together by gear wheels 33 and one of said axles is controlled by the wheel 34 splined on the rotatable shaft 35. A cable 36 attached to the frame 30 may be wound or unwound on a drum 37, so as to raise or to lower said frame with said tube 14 and said stirring device. The exhausted material is discharged through said tube 14 slidably mounted in the sleeve 38 and, through the pipe 15, is supplied to an apparatus 16 of the "Felix" type disclosed in French Patent No. 371,790 of Nov. 24, 1906, or the like, in which the said material is again mixed with water and then is transported to the presses.

The water returning from this apparatus of the "Felix" type, as well as the fresh water, are brought to the top of the second diffuser through the pipe 17. The water from the presses richer in sugar than the water of the apparatus of the "Felix" type is caused to enter midway upon the height of the diffuser, through the tube 18 which is perforated in the portion within the diffuser B. A discharge valve for the diffuser is provided at 19.

A heater 22 (Fig. 2), which is disposed between the first and the second diffuser, serves for the heating of the circulating juice.

The operation is as follows:

It is well known that in the current practice for the diffusion of the solid material, the substance is less dense than the juice in which it is immersed, in the first part of the battery of diffusers, so that in the first diffusers, the material tends to float in the juice and exercises a pressure upon the upper part of the diffusers. But in the last part of the set of diffusers, the solid material, which is exhausted and is more or less completely freed from occluded gases, will have a density somewhat in excess of the water or the diluted juice and it will therefore exercise a pressure upon the bottom of the diffuser.

For this reason, there will be a region in which the relative density will be inverted, and this region will be more or less extended, and its position will vary, according to circumstances.

The size, arrangement and relative dimensions of the two diffusers of the apparatus hereinbefore described are determined by the variation in the relative density of the solid material and the juice during the process of diffusion. These factors are such that the region in which this relative density is inverted is situated in the second diffuser, i. e. that the solid material and the juice in the second diffuser will have the same average density. But in the first diffuser, the mean density of the juice is greater than the density of the solids.

The solid material discharged from the root cutter 24 drops directly into the vessel 1 which is filled with juice up to the determined level 25, this juice being supplied from the first diffuser by the tube 29 into the receptacle 3 and therefrom into the vessel 1.

The centrifugal pump 4 withdraws the juice from a suitably chosen part of the receptacle 3, forces it through the heater preferably heated by steam and discharges it through the pipe 5ª at a suitable point on the elevator 2, in order to obtain the most favorable temperature for the diffusion.

The solids are circulated by means of the elevator whereby they are mixed with the juice and caused to ascend, the material being drained of the juice by means of the perforated double bottom of said receptacle 3. The said material is then discharged into the first diffuser A, after a certain preliminary diffusion.

When the solids drop into the said diffuser, they act by their weight upon the immerged solids, which circulate downwardly, and this circulation is facilitated by the slight taper which is given to the diffuser wall; the solids are then taken up by the conveyor 10 which circulates them into the second diffuser B.

The said conveyor also serves as a closing device which tends to counteract the pressure of the juice which would set up a contrary circulation, while at the same time it maintains any lack of equilibrium between the levels of the solids in each of the two diffusers; the screw 12 aids in the circulation into this second diffuser.

At the upper part of the said diffuser B, the solids are taken up by the stirring device 13 and are circulated into the central telescoping tube 14 from which they are sent into the apparatus 16, and are thence taken up by a pump and circulated into the presses.

Since the maximum temperature for the solid material supplied to the presses is 35–40 degrees C., and the temperature of the water discharged from the presses and from the Felix apparatus being respectively 30 and 40 degrees C. (approximately), the fresh water supplied by the pipe 17 should have a temperature of about 45 degrees C. The residual water from the presses may be returned to the apparatus at the upper part, together with the fresh water, but it is preferably returned to the apparatus at a different height, such as by the tube 18, as already mentioned above.

The level of the water in the second diffuser is maintained to a sufficient height, in such manner as to set up the pressure by which the juice is circulated through the two diffusers, contrary to the movement of the solids. The part of the juice which passes through the filtering surface at the bottom of the diffuser B is sent through the intermediate heater 22, so as to maintain the proper temperature in the pair of diffusers. Upon the outlet pipe of the said heater is provided a branch pipe 26 for the supply of an antiseptic, such as bisulphite of soda, whereby all fermentation will be prevented.

The juice rises in the first diffuser as far as the proper level in the hopper 1 and the receptacle 3, and the discharged juice which proceeds to the tipping device 8 is withdrawn from the said hopper at the proper height.

Obviously, the said invention is not limited to any particular form of construction, and the devices hereinbefore described are given solely by way of example.

Having now described my said invention, what I claim as new and desire to secure by Letters Patent is:—

1. In a diffusion plant, a receptacle for the material to be exhausted, a number of substantially vertical diffusers, means whereby the said material is circulated through said receptacle and said diffusers in a continuous manner and in one direction from said receptacle to the last diffuser, means for feeding exhausting liquid in the last diffuser at the exit end of said material, connecting means between the diffusers and between the first diffuser and said receptacle adapted to allow said exhausting liquid to flow successively in a continuous manner from the last diffuser to said receptacle and in an opposite direction to that of said material in each diffuser and in said receptacle, and means for regulating the level of said liquid in said last diffuser.

2. In a diffusion plant, a receptacle for the material to be exhausted, a number of substantially vertical diffusers, means whereby the said material is circulated through said receptacle and said diffusers in a continuous manner and in one direction from said receptacle to the last diffuser, means for feeding exhausting liquid in the last diffuser at the exit end of said material, connecting means between the diffusers and between the first diffuser and said receptacle adapted to allow said exhausting liquid to flow successively in a continuous manner from the last diffuser to said receptacle and in an opposite direction to that of said material in each diffuser and in said receptacle, a discharging conduit in said last diffuser for discharging the mixture of exhausted material and exhausting liquid and a tube adapted to slide in said discharging conduit and to regulate the level of said mixture in said last diffuser.

3. In a diffusion plant, a receptacle for the material to be exhausted, a number of substantially vertical diffusers, means whereby the said material is circulated through said receptacle and said diffusers in a continuous manner and in one direction from said receptacle to the last diffuser, means for feeding exhausting liquid in the last diffuser at the exit end of said material, connecting means between the diffusers and between the first diffuser and said receptacle adapted to allow said exhausting liquid to flow successively in a continuous manner from the last diffuser to said receptacle and in an opposite direction to that of said material in each diffuser and in said receptacle, a discharging conduit in said last diffuser for discharging the mixture of exhausted material and exhausting liquid, a tube adapted to slide in said discharging conduit and to regulate the level of said mixture in said last diffuser and means for stirring said mixture at the top of said sliding tube and for circulating said mixture towards said discharge conduit.

4. In a diffusion plant, a receptacle for the material to be exhausted, a first and a second substantially vertical diffuser, an elevator adapted to discharge said material to be exhausted from said receptacle into the upper part of the first diffuser, means for feeding exhausting liquid at the upper part of the second diffuser, connecting means adapted to provide communication for the material and for the liquid between the bottoms of both diffusers, a conduit adapted to provide communication for the exhausting liquid between upper parts of the first diffuser and of said receptacle and means adapted to regulate the level of said liquid in the second diffuser.

5. In a diffusion plant, a receptacle for the material to be exhausted, a first substantially vertical diffuser with a transversal section increasing in area towards the bottom, a second substantially vertical diffuser with a transversal section increasing in area towards the top, an elevator adapted to discharge said material to be exhausted from said receptacle into the upper part of the first diffuser, means for feeding exhausting liquid at the upper part of the second diffuser, connecting means adapted to provide communication for the material and for the liquid between the bottoms of both diffusers, a conduit adapted to provide communication for the exhausting liquid between upper parts of the first diffuser and of said receptacle and means adapted to regulate the level of said liquid in the second diffuser.

6. In a diffusion plant, a receptacle for the material to be exhausted, a first and a second substantially vertical diffuser, an elevator adapted to discharge said material to be exhausted from said receptacle into the upper part of the first diffuser, means for feeding exhausting liquid at the upper part of the second diffuser, connecting means adapted to provide communication for the material and for the liquid between the bottoms of both diffusers, conveying means in said connecting means adapted to drive said material from the first to the second diffuser, a conduit adapted to provide communication for the exhausting liquid between upper parts of the first diffuser and of said receptacle and means adapted to regulate the level of said liquid in the second diffuser.

7. In a diffusion plant, a receptacle for the material to be exhausted, a first and a second substantially vertical diffuser, an elevator adapted to discharge said material to be exhausted from said receptacle into the upper part of the first diffuser, means for feeding exhausting liquid at the upper part of the second diffuser, connecting means adapted to provide communication for the material and for the liquid between the bottoms of both diffusers, means adapted to heat the liquid in said connecting means, a conduit adapted to provide communication for the exhausting liquid between upper parts of the first diffuser and of said receptacle and means adapted to regulate the level of said liquid in the second diffuser.

In testimony whereof I have signed my name to this specification.

CHARLES CAMUSET.